(12) United States Patent
Fornof et al.

(10) Patent No.: US 7,484,480 B1
(45) Date of Patent: Feb. 3, 2009

(54) APPARATUS AND METHOD FOR REMOVING CRANKCASE GASES

(75) Inventors: William P. Fornof, Girard, PA (US); Paul G. Reisinger, Lorain, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 11/443,821

(22) Filed: May 30, 2006

(51) Int. Cl.
*F01M 13/00* (2006.01)
*B60T 13/14* (2006.01)
*B60T 15/14* (2006.01)

(52) U.S. Cl. .................. 123/41.86; 303/10; 303/20

(58) Field of Classification Search ............... 123/41.86, 123/574, DIG. 5; 60/405.2; 303/10, 11, 303/26, 20
See application file for complete search history.

(56) References Cited

U.S. PATENT DOCUMENTS

| 3,796,025 | A | * | 3/1974 | Kasten ..................... 96/136 |
| 4,154,326 | A | * | 5/1979 | Wolf ....................... 192/220 |
| 5,239,972 | A | * | 8/1993 | Takeyama et al. ........... 123/573 |
| 5,611,204 | A | | 3/1997 | Radovanovic et al. |
| 2005/0276702 | A1 | | 12/2005 | Reisinger et al. |
| 2007/0107709 | A1 | | 5/2007 | Moncelle et al. |
| 2007/0144155 | A1 | | 6/2007 | Moncelle et al. |

* cited by examiner

*Primary Examiner*—Stephen K Cronin
*Assistant Examiner*—Ka Chun Leung
(74) *Attorney, Agent, or Firm*—Calfee, Halter and Griswold LLP

(57) ABSTRACT

A method includes the steps of connecting the input of a compressor of a vehicle air braking system with a gas output of a crankcase of a vehicle engine, directing into the input of the compressor a blend of from 0% crankcase gases and 100% ambient pressure air to 100% crankcase gases and 0% ambient pressure air. The blend of gases may be filtered upstream of the compressor.

25 Claims, 3 Drawing Sheets

APPARATUS AND METHOD FOR REMOVING CRANKCASE GASES

TECHNICAL FIELD

This invention relates to the evacuation of crankcase gases from the crankcase of a vehicle engine. In certain vehicles, such as heavy trucks, regulations prohibit the venting of crankcase gases to atmosphere. In some prior art vehicles, such gases are drawn from the crankcase by the engine turbocharger, mixed with fresh air, and directed into the engine intake.

It is desirable to keep the crankcase at a "negative pressure"—that is, one low enough to draw blow-by gases into the crankcase, where they can be dealt with by an evacuation system, rather than have the gases emitted into the atmosphere.

DETAILED DESCRIPTION OF AN EMBODIMENT OF THE INVENTION

Figure 1:
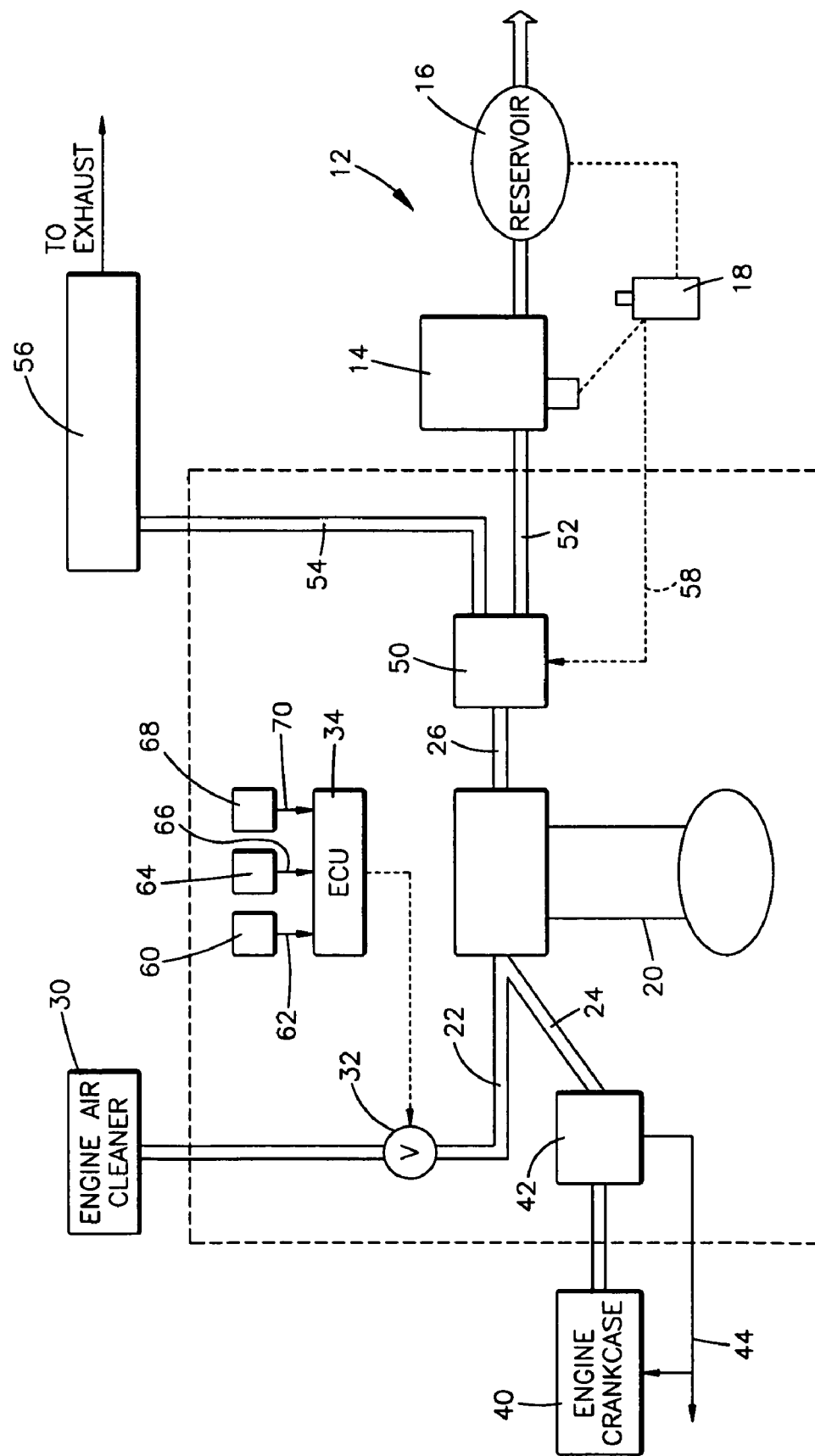
FIG. 1 is a block diagram of a system embodying the invention.

This invention relates to the evacuation of crankcase gases from the crankcase of a vehicle engine. The invention is applicable to varying different apparatus and methods. As representative of the invention, FIG. 1 illustrates an evacuation system 10. The evacuation system 10 is used in association with a vehicle compressed air system 12. The compressed air system 12 includes the vehicle air braking system and includes an air dryer 14, a reservoir 16, a governor 18, and numerous other devices (not shown), such as brake actuators, etc.

The evacuation system 10 includes an air compressor 20. The compressor 20 is the part of the vehicle compressed air system 12 that supplies compressed air to the vehicle braking system. Such a compressor 20 is typically a positive displacement compressor. The compressor 20 has two inputs, indicated by line 22 and line 24. The compressor has an output indicated by line 26.

Line 22 is an air line that extends to the compressor from the engine air cleaner 30 (or from another source of ambient air—that is, air that is naturally aspirated, or non-turbocharged). A flow control valve 32 is located in line 22. The flow control valve 32 is a proportioning valve that is selectively controlled to vary the amount of air flow through line 22 to levels between and including 0% flow and 100% flow. The state of the flow control valve 32 is controlled by a microprocessor, or electronic control unit (ECU), shown schematically at 34.

Line 24 is an air line that extends to the compressor 20 from the crankcase 40 of the engine of the vehicle, to direct crankcase gases from the engine to the compressor. A filter 42 is located in line 24. The filter 42 is operative to remove oil and/or other contaminants from the gases flowing through line 24. The system 10 could, alternatively, include an oil separator in place of the filter 42. Thus, when the term "filtered" is used herein, it means having the oil removed, whether by a filter or by an oil separator or by some other means. Oil that is removed from the gases may be returned to the engine crankcase 40 by an oil return line 44, or may be dumped into the vehicle fuel tank.

Line 26 is an air line that extends from the compressor output to a diverter valve 50. The diverter valve 50 has two outputs for the compressed air coming into the diverter valve, specifically, lines 52 and 54. Line 52 extends from the diverter valve 50 to the air dryer 14 of the vehicle compressed air system 12, and thence to the remainder of the vehicle compressed air system. Line 54 extends from the diverter valve output to the vehicle exhaust system 56. The flow through line 54 may go through a diesel particulate filter and into the exhaust manifold. It should be noted also that the air dryer 14 may be optional as part of the vehicle compressed air system to which the output of the compressor may be directed, as such a system could have a different configuration that that shown in the exemplary embodiment.

Line 58 extends between the diverter valve 50 and the governor 18 that controls the purge cycle of the dryer 14. The governor 18 provides a control signal over line 58 to the diverter valve 50. The control signal is used to set the diverter valve 50 to direct its output over either line 52 or line 54.

The system 10 includes a crankcase pressure sensor indicated schematically at 60. The sensor 60 is operative to sense the pressure of gases in the crankcase 40. An output signal from the sensor 60 is directed to the ECU 34 as indicated at 62.

The system also includes a reservoir pressure sensor 64 or another type of sensor whose output is indicative of the need to charge the vehicle compressed air system 12 including the braking system (system demand). An output signal from the sensor is directed to the ECU 34 as indicated at 66.

The system 10 also includes a compressor rpm sensor shown schematically at 68. Compressor rpm is indicative of compressor demand. An output signal from the sensor 68 is directed to the ECU 34 as indicated at 70.

In operation of the evacuation system 10, the compressor 20 is assumed to be loaded at all times. Alternatively, the compressor 20 might be controlled to be unloaded when the crankcase pressure is so low that it should not be evacuated.

Operation of the compressor 20 causes the compressor to draw crankcase gases from the crankcase 40 through line 24, passing through the filter 42. The filter 42 removes oil and particulate matter, which is recycled back to the crankcase 40 through the return line 44. The output of line 24 is directed to the input of the compressor 20. Thus, the compressor 20 of the vehicle air braking system operates as a pump (suction) to pump gases out of the crankcase 40.

The capacity of the compressor 20 is selected to be able to draw all the crankcase gases needed, in view of the blow-by rate of the engine. The compressor 20 may draw more or less crankcases gases through line 24, and accordingly less or more fresh air through line 22, depending on certain conditions as discussed below.

Specifically, the ratio of crankcase gases to fresh air is varied by the flow control valve 32 under the control of the ECU 34. Relevant inputs to the ECU 34 are crankcase pressure, reservoir pressure, and compressor rpm. The following Table 1 indicates some of the possibilities, which are discussed below along with other, intermediate, possibilities.

TABLE 1

| Crankcase Pressure | Air system pressure | Input control valve position | Diverter control valve position |
| --- | --- | --- | --- |
| Below LSL | Charging | 100% Ambient | To air system |
| Below LSL | Not charging | 100% Ambient | To exhaust |

TABLE 1-continued

| Crankcase Pressure | Air system pressure | Input control valve position | Diverter control valve position |
|---|---|---|---|
| Above USL | Charging | 100% crankcase gases | To air system |
| Above USL | Not charging | 100% crankcase gases | To exhaust |
| Between LSL and USL | Charging | Controlled blending | To air system |
| Between LSL and USL | Not charging | Controlled blending | To exhaust |

In Table 1, the term "LSL" is used to refer to the "Lower spec limit", i.e., the pressure below it is desired that the crankcase pressure not fall. The term "USL" refers to the "Upper spec limit", i.e., the pressure above which it is desired that the crankcase pressure not rise. "Ambient" refers to fresh air intake through line 22, and "crankcases gases" refers to crankcase gases drawn by the compressor from the crankcase through line 24.

Per Table 1, if (1) the compressor 20 is cut in (loaded, or supplying the compressed air system) 12, and (2) the crankcase pressure is less than its lower spec limit (LSL), then the ECU 34 controls the valve 32 so that compressor draws 100% of its requirements from line 22 (fresh air) and none from the crankcase. Opening the flow control valve 32 in line 22, fully, creates enough flow from line A that, effectively, nothing is drawn from the crankcase 40 via line 24. This result is chosen because the crankcase pressure is low enough that the crankcase does not need to be vented.

At the same time, the diverter valve 50 is set to direct compressor output into line 52, to the compressed air system 12, because there is demand for compressed air.

Another set of conditions occurs when the compressor 20 is cut out (unloaded, or not supplying the compressed air system) 12, and (2) the crankcase pressure is less than its lower spec limit (LSL). In this case, the ECU 34 controls the valve 32 so that the compressor 20 draws 100% of its requirements from line 22 (fresh air) and none from the crankcase. This occurs because the crankcase pressure is low enough that the crankcase 40 does not need to be vented.

At the same time, the diverter valve 50 is set to direct compressor output into line 54, to the exhaust system 56. This occurs because there is no demand from the compressed air system 12.

Another set of conditions occurs when (1) the compressor 20 is cut in (loaded, or supplying the compressed air system) 12, and (2) the crankcase pressure is greater than its upper spec limit (USL). In this case, the ECU 34 controls the valve 32 so that the compressor 20 draws 100% of its requirements from line 24 (the crankcase gases) and none from the fresh air line 22. This is accomplished by setting the flow control valve 32 to block flow through line 22. This occurs because the crankcase pressure is high enough that it should be vented.

At the same time, the diverter valve 50 is set to direct compressor output into line 52, to the compressed air system 12, because there is demand for compressed air.

Still another set of conditions can occur when (1) the compressor 20 is cut out (unloaded, or not supplying the compressed air system), and (2) the crankcase pressure is greater than its upper spec limit (USL). In this case, the ECU 34 controls the valve 32 so that the compressor draws 100% of its requirements from line 24 (the crankcase gases) and none from the fresh air line 22. This occurs because the crankcase pressure is high enough that it should be vented.

At the same time, the diverter valve 50 is set to direct compressor output into line 54, to the exhaust system 56. This occurs because there is no demand from the compressed air system 12.

Another circumstance can occur if the crankcase pressure is between (intermediate) LSL and USL. In this case, the control valve 32 is controlled proportionately by the ECU 34 to take a greater or lesser amount of crankcase gases from line 24, and a greater or lesser amount of fresh air from line 22, and blend them. The valve 32 is set to give priority to line 24 from the crankcase 40. The crankcase gases are drawn by the compressor 20 until the crankcase pressure is at a desired level below USL.

The compressor demand (input requirements), as measured by the compressor rpm sensor 68, may vary from time to time, for example, as compressor rpm changes when engine rpm changes. If the compressor demand is relatively high, then the control system may need to take a larger volume of air from the fresh air line 22, than it would otherwise, to add to whatever crankcase gases it may be pulling from line 24. This can be accomplished by programming the ECU 34 to cause the flow control valve 32 to pass more fresh air through line 22 in such circumstances.

On the other hand, if the compressor demand is relatively low, then the control system may not need to take so large a volume of air from the fresh air line 22. The requirements of the compressor 20 would be met by using the crankcase gases alone or a smaller amount of fresh air through line 22.

Figure 2A:
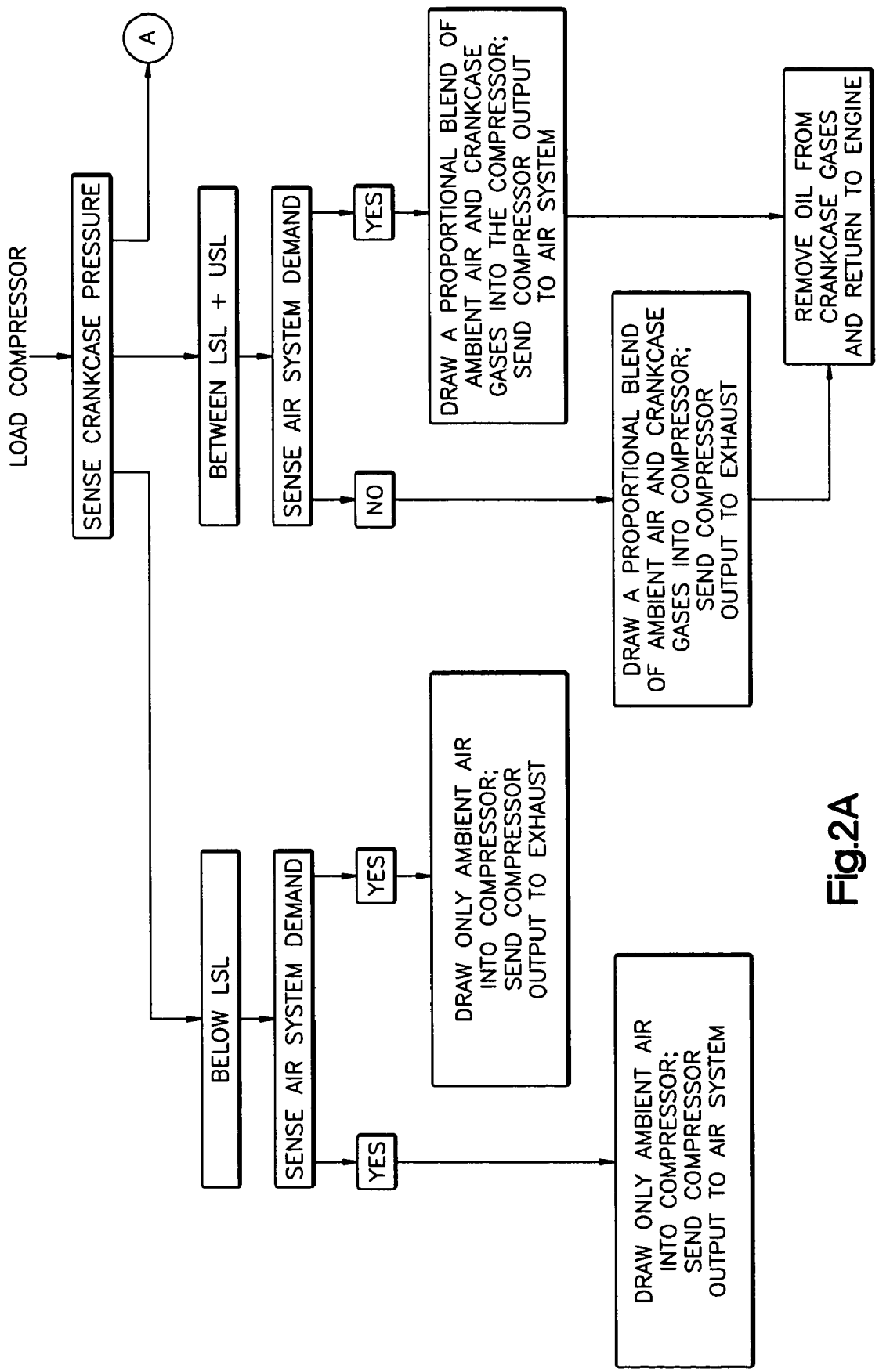
FIGS. 2A and 2B are a flow chart illustrating aspects of the invention.
Figure 2B:
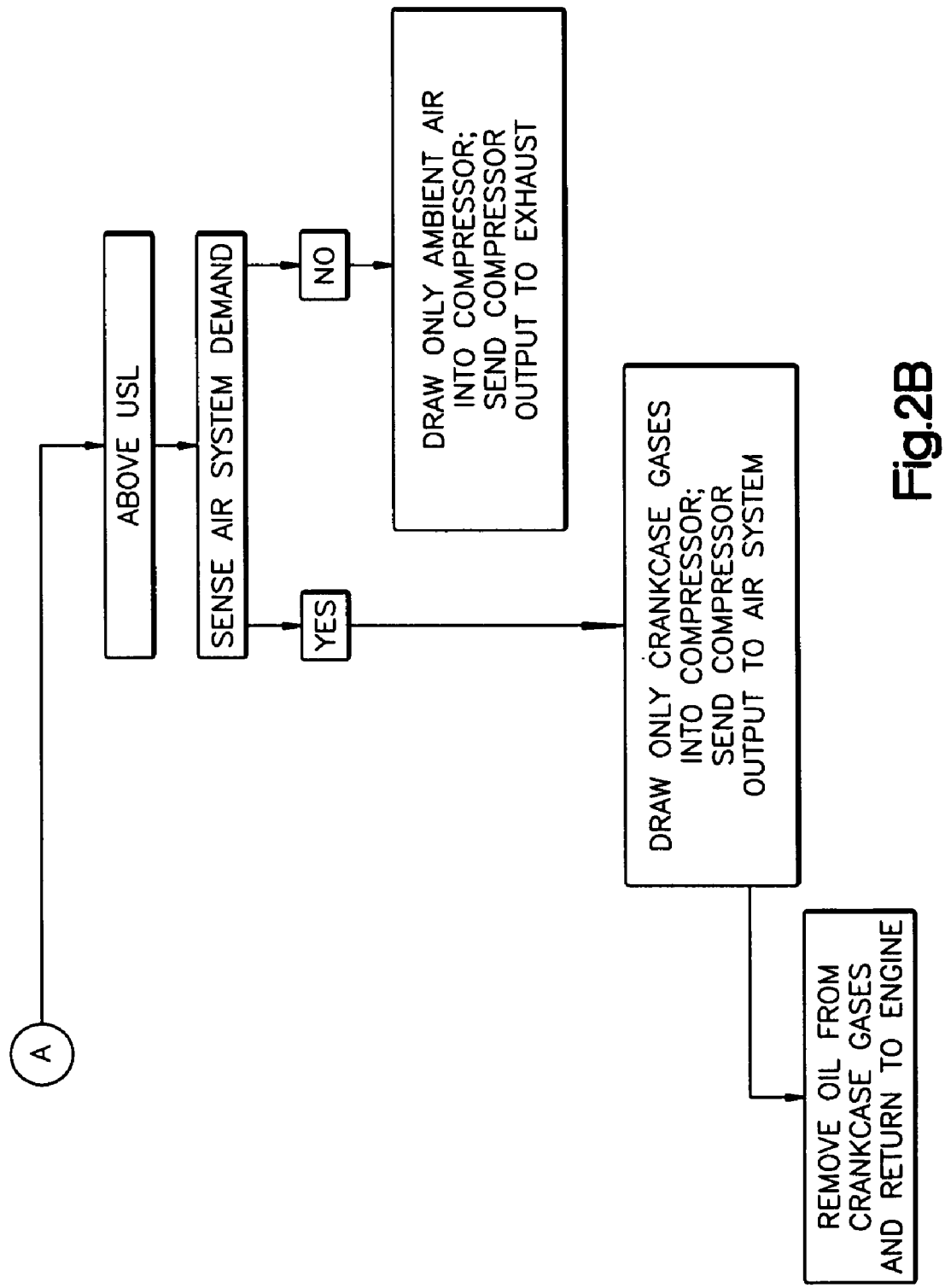

FIGS. 2 and 2A depict graphically the control strategy that may be used in implementing the invention in one embodiment.

When the compressor is loaded, crankcase pressure is sensed. If the crankcase pressure is below LSL, and there is no air system demand, then the control valve is set so that only ambient air is drawn into the compressor. The diverter valve is set so that the compressor output is sent to the vehicle exhaust.

If the crankcase pressure is below LSL and there is air system demand, then the control valve is set so that only ambient air is drawn into the compressor. The diverter valve is set so that the compressor output is sent to the vehicle air system, instead of to exhaust.

If the crankcase pressure is between LSL and USL, and there is no air system demand, then the control valve is set so that a proportional blend of ambient air and crankcase gases is drawn into the compressor. The diverter valve is set so that the compressor output is sent to the vehicle exhaust. Oil that is removed from the crankcase gases is returned to the engine.

If the crankcase pressure is between LSL and USL, and there is air system demand, then the control valve is set so that a proportional blend of ambient air and crankcase gases is drawn into the compressor. The diverter valve is set so that the compressor output is sent to the vehicle air system, rather than to exhaust. Oil that is removed from the crankcase gases is returned to the engine.

If the crankcase pressure is above USL and there is no air system demand, then the control valve is set so that only ambient air is drawn into the compressor. The diverter valve is set so that the compressor output is sent to the vehicle exhaust.

If the crankcase pressure is above USL and there is air system demand, then the control valve is set so that only crankcase gases are drawn into the compressor. The diverter valve is set so that the compressor output is sent to the vehicle air system, instead of to exhaust. Oil that is removed from the crankcase gases is returned to the engine.

From the foregoing description of the invention, those skilled in the art will perceive improvements, changes, and modifications in the invention. Such improvements, changes, and modifications within the skill of the art are intended to be included within the scope of the appended claims.

Having described the invention, we claim:

1. A method comprising the steps of:
   connecting the input of a compressor of a vehicle air braking system with a gas output of a crankcase of a vehicle engine;
   directing into the input of the compressor a blend of from 0% crankcase gases and 100% ambient pressure air to 100% crankcase gases and 0% ambient pressure air; and
   electronically controlling the blend of gases flowing into the compressor.

2. A method as set forth in claim 1 wherein the directing step includes controlling flow of ambient pressure air into the input of the compressor with a valve.

3. A method as set forth in claim 2 including the step of electronically controlling the valve.

4. A method as set forth in claim 1 including the step of filtering crankcase gases flowing into the input of the compressor.

5. A method as set forth in claim 4 wherein the step of filtering the crankcase gases comprises filtering oil from the crankcase gases and returning the filtered oil to the engine.

6. A method as set forth in claim 1 including the step of controlling the input flow into the compressor on the basis of sensed crankcase pressure.

7. A method as set forth in claim 1 further including the step of controlling the input flow into the compressor on the basis of sensed compressor demand.

8. A method as set forth in claim 1 further including the step of selectively directing the output of the compressor either to the vehicle air braking system or to a vehicle exhaust manifold.

9. A method comprising the steps of:
   connecting a gas output of a crankcase of a vehicle engine with an input of a compressor of a vehicle air braking system;
   drawing crankcase gases from the crankcase with the compressor;
   removing oil from the crankcase gases; directing the gases into the input of the compressor after the oil is removed from the crankcase gases; and
   electronically controlling the input flow of gases into the compressor.

10. A method as set forth in claim 9 wherein the step of removing oil from the crankcase gases comprises removing oil with a filter.

11. A method as set forth in claim 9 wherein the step of removing oil from the crankcase gases comprises removing oil with an oil separator.

12. A method as set forth in claim 9 including the step of returning the removed oil to the engine.

13. A method as set forth in claim 9 further including the steps of:
   connecting the input of the compressor also with a source of ambient pressure air; and
   directing into the input of the compressor a blend of from 0% crankcase gases and 100% ambient pressure air to 100% crankcase gases and 0% ambient pressure air.

14. A method as set forth in claim 9 further including the step of selectively directing the output of the compressor either to the vehicle air braking system or to a vehicle exhaust manifold.

15. Apparatus for use in a vehicle having an engine crankcase and having a compressed air braking system including a compressor, the apparatus comprising:
   means for connecting the input of the compressor with a source of ambient pressure air;
   means for connecting the input of the compressor with a source of filtered crankcase gases; and
   means for blending the ambient pressure air and the filtered crankcase gases at a ratio of from 0% crankcase gases and 100% ambient pressure air to 100% crankcase gases and 0% ambient pressure air, the means for blending including an electronically controlled valve for controlling the ambient pressure air flowing into the input of the compressor.

16. Apparatus as set forth in claim 15 wherein the electronically controlled valve includes a flow control valve that is connected with an air intake and with the filtering means, the valve being selectively operable to control the ratio of intake air to filtered crankcase gases that is delivered to the pressed air braking system.

17. Apparatus as set forth in claim 15 further including means for selectively directing the output of the compressor either to the compressed air braking system or to a vehicle exhaust.

18. Apparatus for use in a vehicle having an engine crankcase and having a compressed air braking system, the apparatus comprising:
   a compressor having an input and having an output providing compressed air for use in the compressed air braking system;
   a flow line connected with the compressor input for directing a blend of crankcase gases and ambient pressure air into the compressor input; and
   a control mechanism that is selectively operable to control the ratio of crankcase gases to ambient pressure air in the flow line.

19. Apparatus as set forth in claim 18 wherein the control mechanism includes a valve selectively operable to control the amount of ambient air directed to the flow line.

20. Apparatus as set forth in claim 18 wherein the control mechanism includes an electronic control unit responsive to a plurality of input control signals including an output signal of a crankcase pressure sensor and an output signal of a compressor demand sensor.

21. Apparatus as set forth in claim 18 wherein the control mechanism includes a flow control valve selectively operable to control the amount of ambient air directed to the flow line, and
   an electronic control unit controls the valve.

22. Apparatus as set forth in claim 18 further including a diverter valve for selectively directing the output of the compressor either to the vehicle compressed air system or to an exhaust manifold of the vehicle.

23. Apparatus for use in a vehicle having an engine crankcase and having a compressed air braking system, the apparatus comprising:
   a compressor having an input and having an output providing compressed air for use in the vehicle braking system;

a flow line connected with the compressor input for directing a blend of crankcase gases and ambient pressure air into the compressor input;

a filter for filtering the blend of gases flowing into the compressor input; and a control mechanism that is selectively operable to control the ratio of crankcase gases to ambient pressure air in the flow line.

24. Apparatus as set forth in claim 23 wherein the control mechanism electronically controls the ratio of crankcase gases to ambient pressure in the flow line.

25. Apparatus as set forth in claim 24 further comprising a diverter valve for selectively directing the output of the compressor either to the compressed air braking system or to an exhaust manifold of the vehicle.

* * * * *